United States Patent [19]

Sumitomo

[11] 4,105,184
[45] Aug. 8, 1978

[54] PLASTIC MOLDING ASSEMBLY FOR MOLDING PLASTIC PRODUCTS

[76] Inventor: Ushigoro Sumitomo, 458-43, Oaza Nishiasuma, Omiya-shi, Saitama-ken, Japan

[21] Appl. No.: 812,256

[22] Filed: Jul. 1, 1977

[30] Foreign Application Priority Data

Jul. 13, 1976 [JP] Japan .................................. 51-83351
Dec. 1, 1976 [JP] Japan ................................. 51-144298
Dec. 1, 1976 [JP] Japan ................................. 51-161011
Dec. 1, 1976 [JP] Japan ................................. 51-161012

[51] Int. Cl.$^2$ ......................................... B22D 15/00
[52] U.S. Cl. ..................................... 249/79; 249/111; 264/219; 264/337
[58] Field of Search .................. 249/78, 79, 83, 143, 249/111; 264/327, 219, 225, 337; 425/121, 122, 319

[56] References Cited

U.S. PATENT DOCUMENTS 3,635,623   1/1972   Olson et al. ........................ 249/83 X

*Primary Examiner*—Francis S. Husar
*Assistant Examiner*—John S. Brown
*Attorney, Agent, or Firm*—Weiser, Stapler & Spivak

[57] ABSTRACT

Plastic molding assembly having resistance to elevated temperatures in molding comprising a cooling chamber for flowing a cooling medium within the plastic mold body, a large number of metal radiating wires of good heat conduction and of easy plastic deformation being thoroughly buried within the plastic portion of such body, said metal radiating wires being positioned in such manner as to be in part in contact with the cooling medium within said cooling chamber.

14 Claims, 11 Drawing Figures

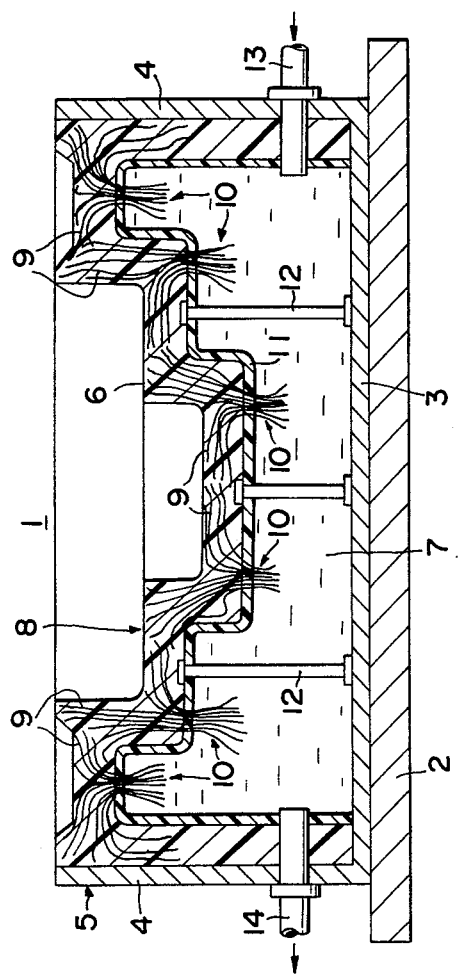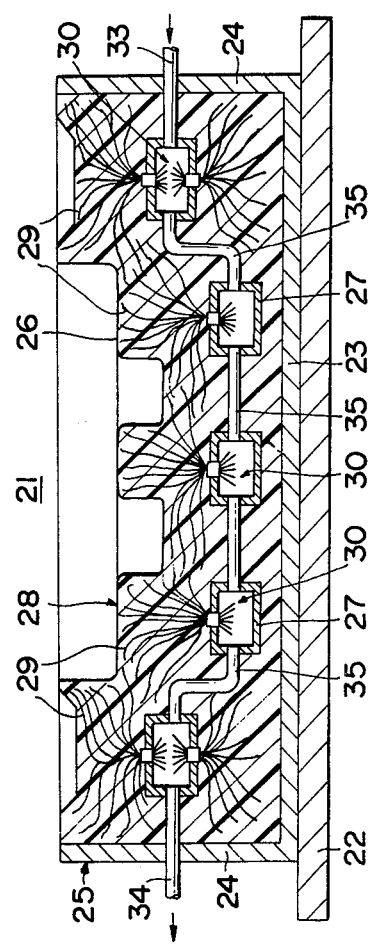

PLASTIC MOLDING ASSEMBLY FOR MOLDING PLASTIC PRODUCTS

This invention relates to a plastic mold to be used for injection-molding, blow-molding, etc. of plastic products.

There is generally used a metal mold for molding plastic products. But this mold is expensive. Thus, plastic molds are sometimes used for molding trial manufactures and a small number of products.

There have been so far known plastic molds made of such synthetic resin as epoxide resin, phenol resin, etc., such molds being cooled by cooling water running within their cores. However, such conventional plastic molds have some disadvantages. When used for molding a small number of trial manufactures, such molds have been deformed by high temperatures genarated at the time of molding, or occasionaly broken.

The object of the present invention is to provie plastic molds having good indurability to be used for molding plastic products.

The distinctiveness of the present invention is that a plastic molding assembly comprises a cooling chamber for flowing a cooling medium within the plastic mold body, a large number of metal radiating wires of good heat conduction and of easy plastic deformation being buried thoroughly within the plastics portion of such body and such metal radiating wires being positioned in such manner as to in part in contact with a cooling medium within said cooling chamber.

Thus, the plastic mold of the present invention is cooled by the cooling medium. Further, the low temperature from the cooling medium is circulated through a large number of metal radiating wires thoroughly within the plastic mold body. The heat generated in the plastic mold body is radiated into the cooling medium. Thus, the plastic mold can have a sufficient resistance to high temperatures generated at the time of molding. The plastic mold can also have a good strength, since a large number of metal radiating wires are buried within the plastic mold body.

The other advantage of the present invention is that, since the metal radiating wires are of easy plastic deformation, each metal radiating wires may be easily positioned in any desired location within the plastic portion of the plastic mold body. Thus, it is easy to manufacture the mold.

The preferred embodiment of the present invention will be hereinafter described with reference to the accompanying drawings.

FIG. 1 is a longitudinal-sectional view of the plastic mold of the present invention.

FIG. 2 is a longitudinal-sectional view of another embodiment.

Figure 3:
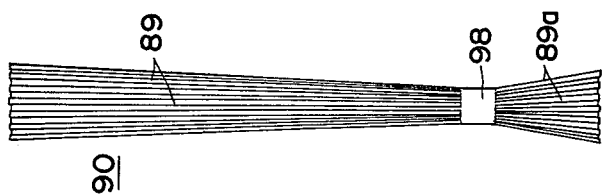
FIG. 3 is an enlarged view of a radiating wire bundle.

Referring to FIG. 1, the plastic mold 1 is one of a set of split molds for blow-molding. There is fixed, in front of a metal platen 2, a metal frame 5 made of the base plate 3 and side walls 4. A plastic mold body 8 is positioned within the frame 5. The plastic mold body is in a water-tight relation with the frame. This mold body has a cavity 6 in its front and a hollow in the rear. There is formed a cooling chamber 7 between the hollow of said body 8 and the frame 5.

Said plastic mold body 8 is made of tooling plastics, such as for example, epoxide resin, which is mixed with iron fillings, powdered graphite, powdered alminium silicate, borax, etc. alone or in combination. This body 8 is provided on its side facing the cooling chamber with a reinforcing liner comprising reinforced plastics made of epoxide resin, etc. mixed with glass fibers, etc. The body is supported by a plurality of stays 12 positioned on the base plate 3.

One of the side walls 4 is provided with a feed pipe 13 communicating between outside and the cooling chamber. The other side wall is provided with a exaust pipe 14 communicating between the inside of the cooling chamber and outside. Thus, cooling liquid is fed through the feed pipe 13 into the cooling chamber 7 for cooling the rear side of the plastic mold body 8, and then discharged out thereof through the exaust pipe 14.

There are buried a plurality of bundles 10 comprising many metal radiating wires of good heat conduction and easy plastic deformation, having appropriate space therebetween, within the plastics portion of said plastic mold body 8, in such manner that said radiating wires 9 are in part immersed in the cooling liquid of the cooling chamber. Said radiating wires are preferably made of aluminium or alloy thereof, lead, tin-lead alloy, copper, zinc, etc.

Many radiating wires 9 consistuting said bundles are spread in a branch-form and extended into the plastic portion of the plastic mold body 8. Further, many radiating wires are spread in a root-form and immersed in part in the cooling liquid. Thus, a plurality of the bundles 10 of radiating wires cause their radiating wires 9 to run throughout inside the plastic portion of plastic mold body 8. Said radiating wires 9 carry the lower temperature of cooling liquid thoroughly into the inside of the plastic mold body, and cool the whole of the plastic mold body. When the plastic mold body 8 is heated at the time of molding, the radiating wires discharge the high temperature of the plastic mold body 8 into the cooling liquid. Thus, the plastic mold of the present invention can be continuouly used for molding the intended plastic products.

When manufacturing said plastic mold body 8, there is first prepared a model of wooden pattern, etc. made after the shape of the intended plastic products. Then, liquid epoxide resin is applied on the surface of such model and each radiating wire 9 of the radiating wire bundle is buried in said resin. In this case, if the radiating wire 9 is of easy plastic deformation, said radiating wire may be freely positioned at any place as desired.

Another embodiment of the plastic mold of the present invention will be hereinafter explained with reference to FIG. 2. There are formed within the plastic mold body 28 a plurality of cooling chambers, with an appropriate space between them, made of synthetic resins, metals, etc.. These cooling chambers 27 are connected with each other by means of connecting pipes 35.

The cooling chamber 27 positioned on one side is provided with a cooling gas feed pipe 33 and the cooling chamber 27 on the other side, with a cooling gas exhaust pipe 34.

Figure 4:
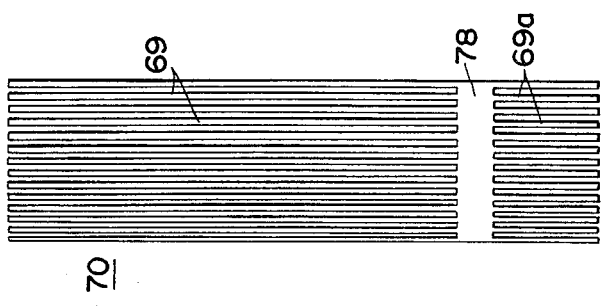
FIG. 4 is an enlarged view of a radiating wire bundle bound by a band.

The radiating wire bundle 30 is prepared, as shown in FIG. 4, by binding a large number of metal radiating wires made of such material as being of good heat conduction and easy plastic deformation, for example aluminium, with a band 36 in their middle part. A plurality of such radiating wire bundles 30 have their radiating wires 29 spread into the inside portion of plastic mold body 28 in a branch-form and buried throught out the same. These radiating wire bundles are in part inserted within either one of cooling chambers 27. Thus, their radiating wires 29 are in part in contact with the cooling gas within the cooling chamber. Such numbers as 21, 22, 23, 24, 25 and 26 in FIG. 2 refer to substantially the same parts in FIG. 1.

Since the radiating wire bundle 30 is bound by the band 36 in its middle part, it becomes easier to do the work for applying the aforementioned resin and burying the radiating wires, when manufacturing said plastic mold body 28.

Figure 5:
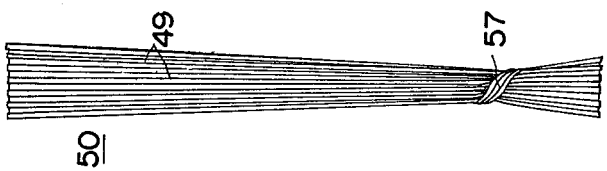
FIG. 5 is an enlarged view of a radiating wire bundle twisted and bundle.

There will be described another example of the radiating wire bundle which may be used for said plastic mold 1 or 21. The radiating wire bundle 50 in FIG. 5 comprises a large number of radiating wires 49 twisted in their middle part. The twisted part is indicated by number 57.

Figure 6:
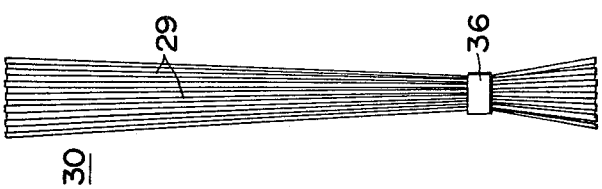
FIG. 6 is an enlarged view of a radiating wire group bound by means of a connecting piece.

The radiating wire group 70 in FIG. 6 comprises a plurality of radiating wires 69 and 69a extending in two directions from both sides of a band-shape metal connecting piece which is capable of good heat conduction and plastic deformation.

Figure 7:
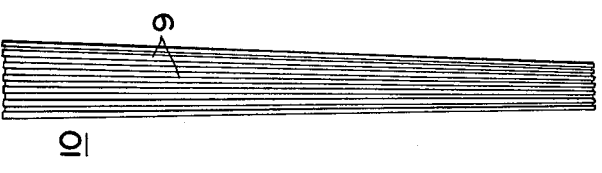
FIG. 7 is an enlarged view of a radiating wire bundle which is prepared by rolling the radiating wire group in FIG. 6.

The radiating wire bundle 90 in FIG. 7 is prepared by rolling the aforementioned radiating wire group in FIG. 6. The number 98 indicts a connecting piece. Numbers 89 and 89a refer to the parts which are substantially the same as those of FIG. 6.

Figure 8:
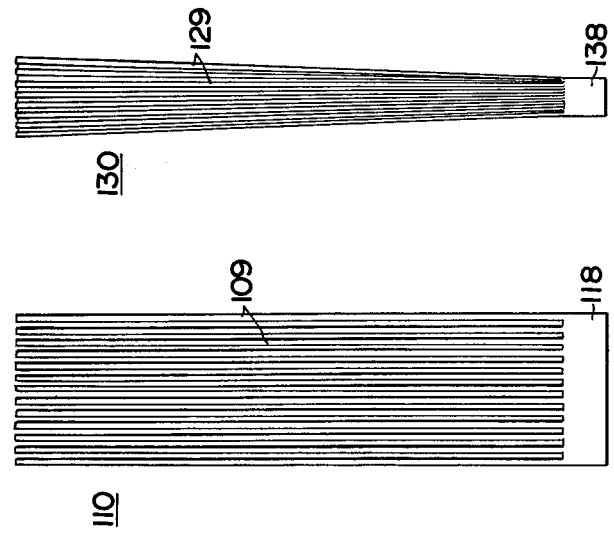
FIG. 8 is an enlarged view of another example of radiating wire group bound by means of a connecting piece.

The radiating wire group 110 in FIG. 8 comprises a large number of radiating wires 109 extending in one derection from one side of a band-shape metal connecting piece which is capable of good heat conduction and plastic deformation. When this radiating wire group 110 is used for said plastic mold body 1 or 21, the connecting piece 118 is inserted within the cooling chamber 7 or 27.

Figure 9:
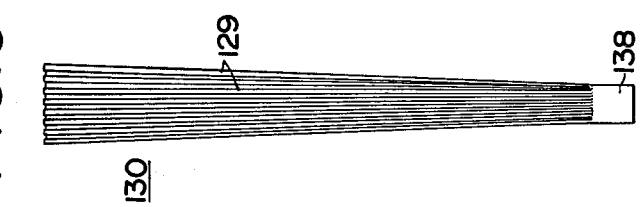
FIG. 9 is an enlarged view of a radiating wire bundle which is prepared by rolling the radiating wire group in FIG. 8.

The radiating wire bundle 130 in FIG. 9 is prepared by rolling the radiating wire group in FIG. 8. The number 138 indicates a connecting piece. The number 129 refers to a part which is substantially the same as the one in FIG. 8.

Figure 10:
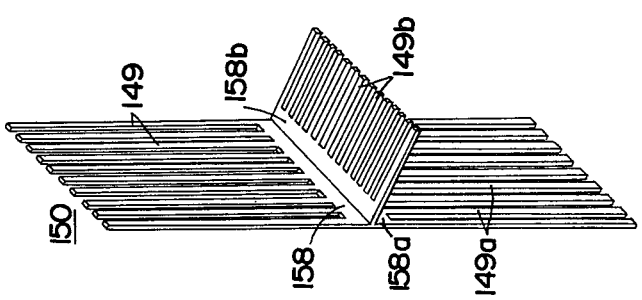
FIG. 10 is an enlarged view of a radiating wire group comprising a large number of radiating wires extending in three directions.

The radiating wire group 150 in FIG. 10 is prepared by binding three band-shape connecting pieces 158, 158a and 158b with each other by means of weldering, etc. and by extending a large number of radiating wires 149, 149a and 149b in three directions from the end of each connecting piece. Preferably, the radiating wires 149b should be shorter than other radiating wires 149 and 149a. When this radiating wire group 150 is used for said plastic mold body 1 or 21, the shorter radiating wires 149b are inserted within the cooling chamber 7 or 27.

Figure 11:
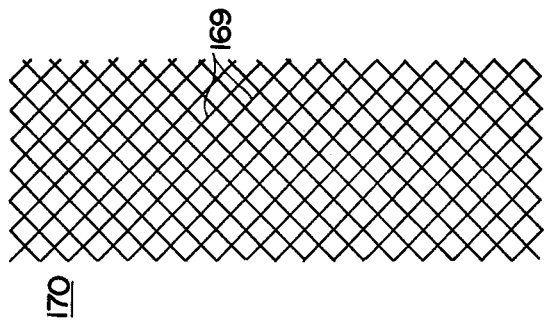
FIG. 11 is an enlarged view of radiating wire group organized in a net-form.

The radiating wire group 170 in FIG. 11 comprises a large number of radiating wires formed in a net-form. The intersecting radiating wires are joined with each other in such manner that heat can transmit from one to another.

I claim:

1. A plastic mold for molding plastic products comprises a plastic mold body, a cooling chamber positioned adjacent to said plastic mold body for flowing a cooling medium to cool said body, and a large number of metal radiating wires of good heat conduction and easy plastic deformation buried throughout inside the plastic portion of said plastic mold body and positioned within the cooling chamber in such manner as to discharge heat into said cooling medium.

2. A plastic mold according to claim 1 further comprises a metal frame in which said plastic mold body is positioned.

3. A plastic mold according to claim 2 wherein said cooling chamber is formed between the rear side of said plastic mold body and said frame.

4. A plastic mold according to claim 1 wherein said cooling chamber is formed within said plastic mold body.

5. A plastic mold according to claim 1 wherein a plurality of cooling chambers are formed within said plastic mold body, each cooling chamber being connected with each other by means of a connecting pipe.

6. A plastic mold according to one of claim 1, inclusive wherein a large number of said radiating wires are grouped into a plurality of radiating wire groups.

7. A plastic mold according to claim 6 wherein said radiating wire group is bundled in its middle part by means of a band.

8. A plastic mold according to claim 6 wherein said radiating wire group is bundled by means of twisting in its middle part.

9. A plastic mold according to claim 6 wherein said radiating wire group comprises a large number of radiating wires extending in two directions from the metal connecting piece which is capable of good heat conduction and plastic deformation.

10. A plastic mold according to claim 6 wherein said radiating wire group is prepared by rolling a large number of radiating wires extending in two directions from the metal connecting piece which is capable of good heat conduction and plastic deformation.

11. A plastic mold according to claim 6 wherein said radiating wire group comprises a large number of radiating wires extending in one direction from the metal connecting piece which is capable of good heat conduction and plastic deformation.

12. A plastic mold according to claim 6 wherein said radiating wire group is prepared by rolling a large number of radiating wires extending in one direction from the metal connecting piece which is capable of good heat conduction and plastic deformation.

13. A plastic mold according to claim 6 wherein said radiating wire group comprises a large number of radiating wires extending in three directions from the metal connecting piece which is capable of good heat conduction and plastic deformation.

14. A plastic mold according to claim 6 wherein said radiating wire group comprises a large number of radiating wires organized in a net-form and joined with each other in their intersecting points in such manner as to be capable of heat conduction.

* * * * *